Aug. 8, 1961  P. WARREN  2,995,700
TUBE TESTING APPARATUS
Filed March 13, 1957  2 Sheets-Sheet 1
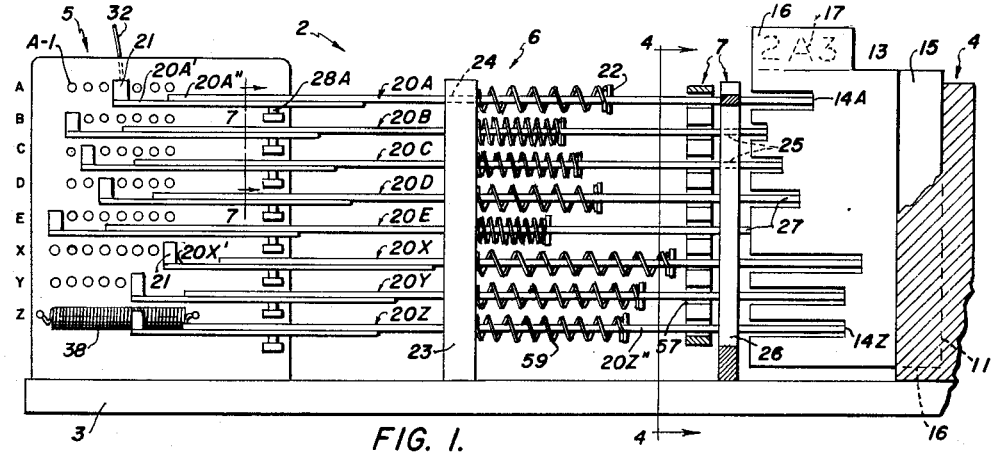
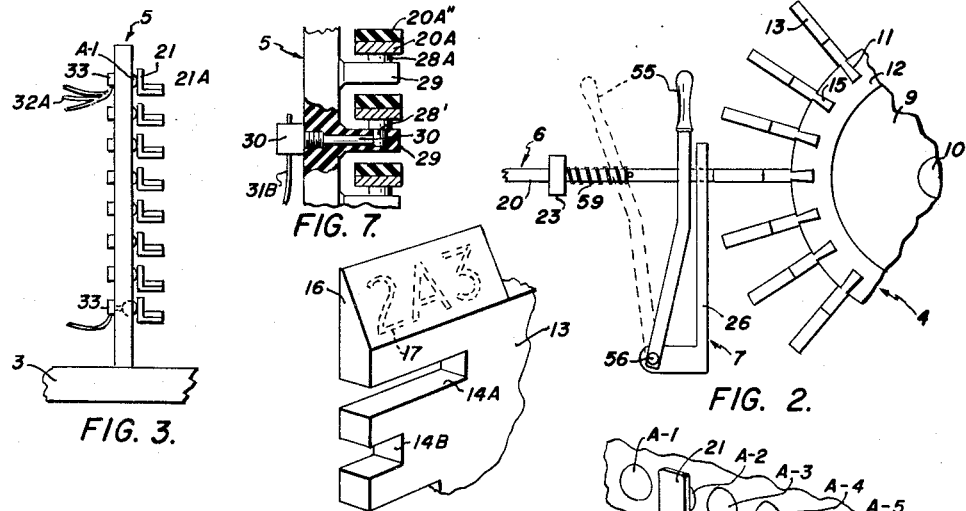
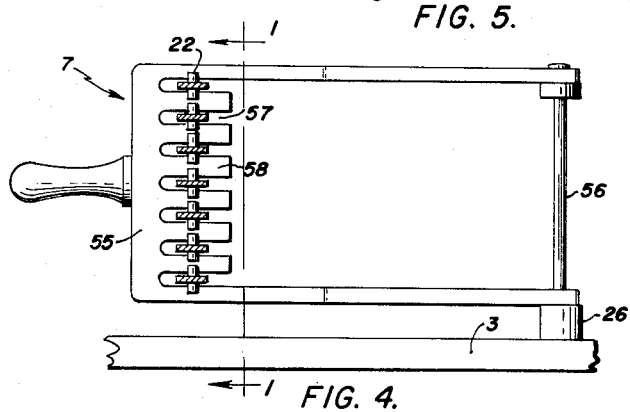
PAT WARREN
INVENTOR.
BY *Herbert J. Brown*
ATTORNEY

United States Patent Office 2,995,700
Patented Aug. 8, 1961

2,995,700
TUBE TESTING APPARATUS
Pat Warren, 2508 Vogt, Fort Worth, Tex.
Filed Mar. 13, 1957, Ser. No. 645,779
3 Claims. (Cl. 324—22)

This invention relates generally to electrical testing apparatus and more specifically to that type of test equipment known in the trade as a tube tester.

It is therefore the primary object of this invention to provide an improved testing apparatus to facilitate testing of electron or vacuum tubes such as, but not limited to, the type used in the radio and television fields.

Another object is to provide a truly automatic tube tester wherein manual operation of setting switches has been eliminated.

A further object is to provide a tube testing machine wherein human errors in setting multiple contacts has been dispensed with.

A further object is to provide a tube testing apparatus which may be operated at a greater speed than conventional apparatus.

And yet another object is to provide a fool-proof tube testing machine which is both simple and accurate in operation, and may be operated by unskilled personnel with a minimum of instruction.

And another object is to provide a tube testing machine in which a series of contacts are moved into their properly selected position in the testing circuit simultaneously.

And yet a still further object of this invention is to provide a simple and economical apparatus and yet one which is exceedingly effective for the purposes intended.

These and other objects and advantages will be apparent from an examination of the specification and drawing, in which:

FIGURE 1 represents a side elevational view partly in fragmentary cross section (lines 1—1 of FIGURE 4) of the tube testing apparatus of this invention.

FIGURE 2 is a fragmentary top plan view of the device shown in FIGURE 1.

FIGURE 3 is an end elevational view of the device of FIGURE 1 taken at the left hand end thereof.

FIGURE 4 is a detail view of the circuit clearing or "zeroing" shifter of FIGURES 1 and 2 shown partially in section along the lines 4—4 of FIGURE 1.

FIGURE 5 is a fragmentary detail view of the upper end of a typical selector plate used with the apparatus of FIGURE 1.

FIGURE 6 is an enlarged fragmentary detail view of the contact arm and contact buttons shown in FIGURE 1.

FIGURE 7 is an enlarged fragmentary cross section taken along the lines 7—7 of FIGURE 1.

Figure 8:
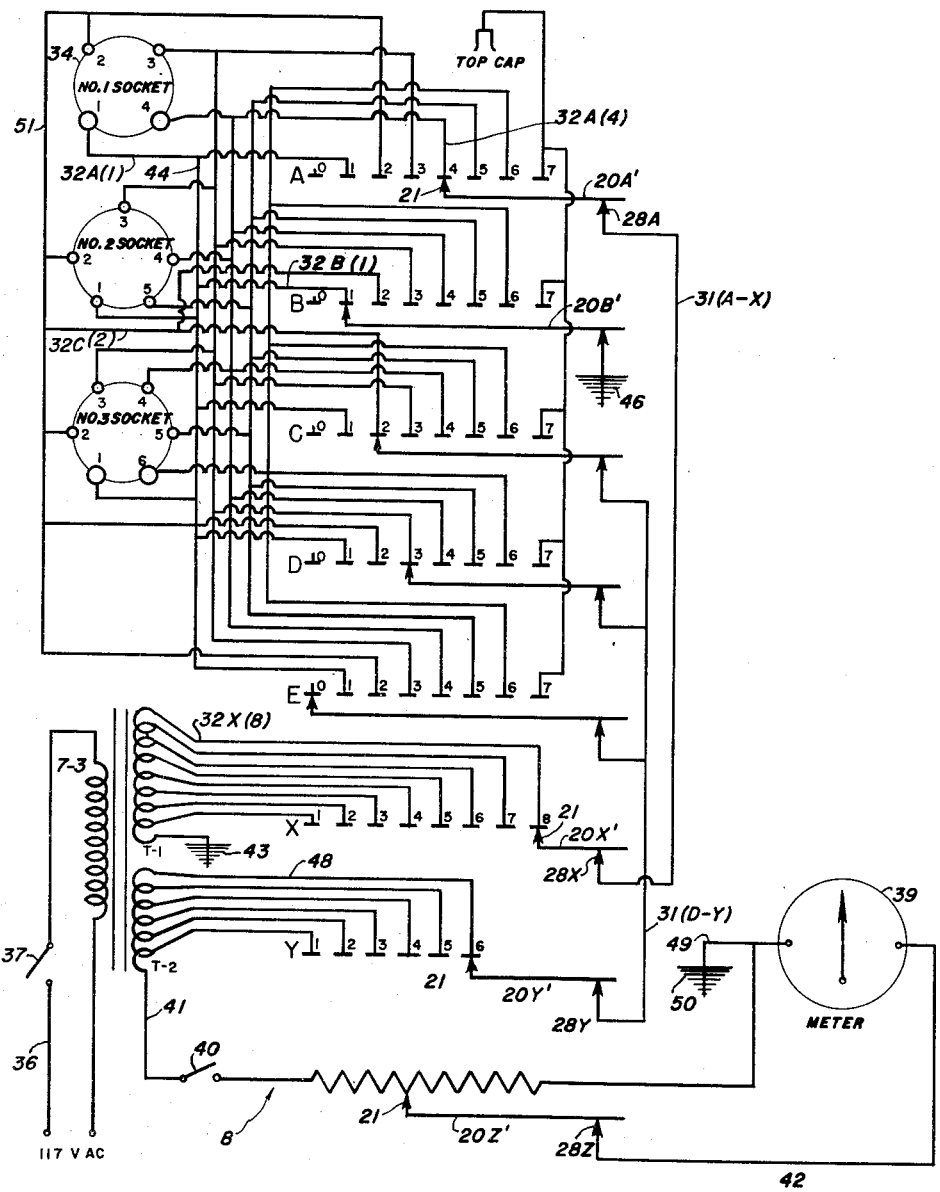
FIGURE 8 is a circuit diagram of a typical and exemplary electrical system which may be employed with the instant invention.

Referring now more particularly to the characters of reference on the drawing it will be observed in FIGURES 1 and 2 that tube testing apparatus of this invention, indicated generally at 2, consists basically of a supporting base 3 having a rotary selector wheel unit 4 at one end, an upstanding contact board unit at the other end 5, a guided multiple contact bar assembly 6 located therebetween, and a circuit clearing shifter unit 7, all of which units and assemblies are in cooperative relation with each other and with the tube testing electrical circuit indicated generally at 8 in FIGURE 8. This electrical circuit includes multiple selective contacts, such as A–1 to A–7 and B–1 to B–7 which individual contacts must be properly "oriented" relative to each other to provide the proper total circuit for testing a particular tube.

Examining the individual parts in more detail it will be seen that the selector wheel unit 4 actually comprises a circular wheel 9 having a substantial axial height and journalled on a vertical center shaft 10 for easy manual rotation, and having radial dovetail notches 11 at equally spaced locations about the circumferential ring 12 of the wheel 9. A series of selector plates 13, having a different combination of various length notches 14, but having identical dovetail ends 15, are inserted in the notches 11 of wheel 9; and each plate 13 is forced downward until it shoulders at stop 16 which is formed by the termination of notch 11 short of the full height of wheel 9. Each selector plate 13 includes a top tab 16 on which is imprinted a tube number to identify the specific electron tube for which the particular combination of notches 14 will properly orient the electrical circuit 8; for example, the combination of notches 14 on the plate 13 of FIGURE 1 will cause the contact bar assembly 6 to be properly set so that a number 2A3 electron tube may be tested on the apparatus 2.

The structure and operation by which the contact bar assembly 6 set up the circuit 8 to test a particular tube may be explained by reference to FIGURES 1, 3 and 8. The relatively long contact bar assemblies 20A—20Z are actually made up of two longitudinally extending pieces: one of which, conductor bar 20A′, is made of a conducting material such as copper and includes a contact lip 21; and the other of which, guide bar 20A″ is made of a non-conducting or dielectric material such as ceramic or plastic and includes a pressed-in radial pin 22; and the contact bar assembly is completed when the two aligned members 20A′ and 20A″ are joined by riveting or other means (not shown). A vertical structural guide 23 includes a series of vertically aligned square holes 24 through which the dielectric bar 20A″ is adapted to slide and be guided thereby at a point intermediate its length; the similarly aligned holes (square) 25 of support 26 of shifter unit 7 guide and support the bar assemblies 20A—20Z near their rear or free ends 27. The forward or contact (21) end of bar assemblies 20 ride on and over electric contact 28 which is internally connected through boss 29 by the binding contact of tip 30′ of terminal screw 30 against the tip 28′ of contacts 28A—28Z; by this construction, the lead wire 31B of the leads 31A—31Z which extends through and is soldered in contact screw 30, is in continuous electrical contact with bar 20′ and consequently with the selected contact button A–4 on board 5 that is in engagement with tip 21. It will be noted that the length of the topmost notch 14A on selector plate 13 (FIGURE 1) is such that the conductor bar 20A completes the electric circuit between lead 31A and lead 32A which is attached through terminal screw 33 to contact button A–4 and which lead 32A(4) is electronically connected with pin "4" of tube test socket 34.

To complete the power requirement of this one particular circuit which was chosen as exemplary; the lower end of lead 31 is seen to be in contact with 28X and with contact button X–8 which is connected by lead 32X(8) of FIGURE 8 to transformer secondary winding T–1 which is energized from a primary winding T–3 in power circuit 36 upon closing of switch 37. In FIGURE 1 the physical movements corresponding to the circuit just described may be seen to be the position of bar 20X′ whereat its tip 21 is engaging contact button X–8 to complete the power circuit described.

After the current enters pin 4 of socket 34, it passes through some functional section of the tube being tested and then out to ground or to otherwise complete the circuit. In one particular instance, since transformer winding T–1 is grounded at 43, the circuit may be completed through a tube inserted in socket 34 from pin 4 to pin 1 and then out through lead 32A(1), down lead 44 to its connection to lead 32B(1) and thence over to button B-1 from which it passes through bar 20B' to a ground 46.

Similarly, each of the notch locations 14A—14Z will cause some effect on the circuit 8, even if the function is as shown at bar 20D where the absence of a notch causes bar 20D to move completely beyond the end button E-1 and therefore act as a switch to remove this particular bar's function from the circuit for this particular (2A3) tube tested. However, for each of the several tubes tested there will be a corresponding position for the lowermost bar 20Z since this bar has its contact tip 21 in contact with a variable resistor 38 which supplies power from transformer secondary T-2 to meter 39 when the "meter read" switch 40 is closed to complete the circuit through leads 41 and 42. The other activated lead 48 of secondary T-2 (at this setting) will form a completed circuit through its contact button Y-6, bar 20Y, lead 31(D—Y), contact button D-3 and to pin 3 of socket 34 in a similar manner to that described in completing the circuit to pin 4. Meter 39 is now seen to complete its circuit through lead 49 and ground 50. The circuit of remaining pin 2 of the tube being tested is also similarly completed through lead 51 and 32C(2) and contact button C-2.

After a particular tube has been tested, as was 2A3 in the example, it is desirable to clear the circuit or "zero" the apparatus 2, so that it will be ready to receive the next desired selector plate 13. This "zeroing" function is accomplished by the shifter unit 7 which is composed of a handle operated swinging yoke 55 which is pivotally attached to vertical pin 56 which extends between spaced points of L-shaped support 26 which is itself rigidly supported from base 3. Yoke 56 includes a series of horizontal notches 57 which align with successive bars 20A"—20Z" and which notches are separated by tabs 58 which extend a short distance beyond the bars so that when yoke 55 is manually moved toward guide 23 the tabs 58 will ride against the upper and lower ends of pins 22 (FIGURE 4) of all of the bars 20A—20Z and further movement of yoke 55 will carry bars 20A—20Z with it and compress springs 59 which are installed over the bars to apply pressure between guide 23 and pins 22 so that the bars are under constant urging pressure in the direction of selector plate 13. While yoke 55 is held in the position shown dotted in FIGURE 2, the selector wheel 9 may be freely rotated until a specific desired plate 13 is in direct alignment with bars 20, at which point, yoke 55 is gradually released, and each of the separate bars 20A—20Z will engage its corresponding notch 14A—14Z and the springs 59 will cause the ends 27 to fully seat at the bottom of each notch. At this point the operator need merely to close the "meter read" switch 40 to check a particular tube.

The invention is not limited to the exemplary construction herein shown and described, but may be made in various ways within the scope of the appended claims.

What is claimed is:

1. A tube testing apparatus comprising: an electrical multiple tube testing circuit, means to orient said circuit to properly test a specific tube, said means comprising a group of aligned individual contacts, a spring loaded longitudinally movable conductor bar adapted to move to a specific contact corresponding to said specific tube to provide the proper electrical orientation therefor, a movable selector plate having notches therein corresponding to said specific tube in alignment with said bar to hold said bar in said notches against said specific contact and prevent further expansion of said spring of said spring loaded conductor bar.

2. A tube testing apparatus comprising: an electrical multiple tube testing circuit, means to orient said circuit to properly test a specific tube, said means comprising a group of aligned individual contacts leading to one part of said circuit, a spring loaded conductor bar adapted to move to a specific contact corresponding to said specific tube to provide the proper electrical orientation therefor, a second contact, leads attaching said second contact to another part of said circuit, said conductor bar adapted to slide on said second contact and remain in continuous electrical engagement therewith, means to move said bar in a direction to compress the spring of said spring loaded conductor bar, a selector plate corresponding to said specific tube, a notch in said plate in alignment with said bar, whereby upon release of said compressing means said bar is adapted to move under pressure of its spring into firm engagement with said notch and providing at such engagement a continuous electrical circuit from said second contact to a selected individual contact corresponding to said specific tube and selector plate.

3. A tube tester comprising: an electrical multiple tube testing circuit, means to orient said circuit to properly test a specific tube, said means comprising a base, a contact board on said base, a selector wheel journalled to rotate at a spaced location on said base from said board, a guided multiple contact bar assembly on said base and located between said board and said wheel, electrical conductor bars in said assembly adapted to slide in a direction from said wheel to said board, electric contacts on said board, certain of said contacts corresponding to said specific tube, one end of said conductor bar adapted to slide over said contacts while electrically engaging them, spring means to urge the other end of said conductor bar against said selector wheel, and means on said selector wheel to stop said bar at the proper point to cause said one end to engage said certain contact.

References Cited in the file of this patent

UNITED STATES PATENTS

| | | |
|---|---|---|
| 1,997,158 | Thomas | Apr. 9, 1935 |
| 2,099,002 | Crocker | Nov. 16, 1937 |
| 2,198,503 | Morrison | Apr. 23, 1940 |
| 2,217,925 | Triplett | Oct. 15, 1940 |
| 2,477,741 | Haberman | Aug. 2, 1949 |
| 2,706,230 | Bourns | Apr. 12, 1955 |
| 2,777,925 | Stolz | Jan. 15, 1957 |
| 2,851,660 | Tobin et al. | Sept. 9, 1958 |
| 2,903,529 | Hanthorn | Sept. 8, 1959 |

OTHER REFERENCES

"Automatic Functional Tester," article in Electronic Design, June 15, 1956, pages 46 and 47.